United States Patent Office 3,164,481
Patented Jan. 5, 1965

3,164,481
ANTISTATIC AGENTS
William J. Shibe, Jr., Riverton, N.J., assignor to Hollichem Corporation, Camden, N.J., a corporation of New Jersey
No Drawing. Filed Aug. 18, 1961, Ser. No. 132,286
4 Claims. (Cl. 106—10)

This invention relates to antistatic agents, and it particularly relates to the use of quaternary ammonium benzosulfimides as antistatic agents.

Electrically non-conductive material, such as paper, glass, textiles, rubber, plastics, etc., generate static electricity. This is a well-known phenomenon. A consequence of this static electricity is the adhesion of minute particles from the air, such as dust, dirt, grime, etc., on the surfaces of the non-conductive materials; these particles being held on the surfaces by the action of the static charges.

Various substances have heretofore been contemplated for use as antistatic agents for the aforesaid non-conductive materials. Ordinary quaternary ammonium salts are utilizable for antistatic purposes. However, these latter compounds are limited in their application for such purpose because they are relatively corrosive and are all easily leached out by water. They are, furthermore, disagreeable to the senses, especially to taste.

It has now been discovered that many quaternary ammonium benzosulfimides make ideal antistatic agents when physically combined with electrically non-conductive substances because they are non-corrosive, many of them are not readily leached out by water, and they are not only not disagreeable but actually sweet and agreeable to the taste.

The antistatic properties of the aforementioned quaternary ammonium benzosulfimides make them highly desirable in waxes and polishes for furniture, automobiles, floors, walls and the like. These waxes and polishes, when applied to the surfaces to be treated, not only provide an attractive and protective finish but also prevent the accumulation of dust, dirt, grime and the like which would otherwise occur as the result of static electricity on these surfaces. Furthermore, there is no corrosive effect on the surfaces such as would be occasioned by the use of ordinary quaternary ammonium salts. In addition, the antistatic properties provided by many of these compounds, especially those which are water-insoluble, are relatively permanent even when the surfaces, such as automobile bodies, are exposed to heavy rains or washings.

The quaternary compounds utilized in the present invention are also valuble in the antistatic treatment of paper, textiles, skins, leathers, furs, plastics and other such electrically non-conductive materials. They are substantive to all these various materials and their compatibility with polymeric materials such as epoxy resins, phenolics, acrylates, cellulose esters, polyolefins, polyurethanes, polyvinyls, nylon, etc. make them ideal for blending, impregnating or coating such materials. The blending particularly, lends itself to a single-process manufacture since the quaternary can be intermixed with the polymeric materials and extruded, molded or cast together therewith into the final product. The terminology "physically combining" is used herein to designate such blending, impregnating or coating as distinguished from "chemically combining" wherein there is a chemical reaction between the substances.

The quaternary compounds of this invention find especial utility in the manufacture of products which are subject to oral use such as drinking cups, toothbrush handles and bristles, children's plastic toys and the like. The non-corrosive nature and agreeable taste of these quaternary ammonium benzosulfimides permit them to be readily used in such products for preventing the accumulation of dust, dirt, grease, grime, etc. Furthermore, since these quaternaries are themselves highly active germicidal and fungicidal substances, even at very low concentrations, they serve the highly important dual functions of biocidal and dirt-preventative agents.

The quaternary ammonium benzosulfimides of the present invention have active antistatic capabilities at relatively low concentrations down to about 1% by weight. Of course, the higher the concentration, the greater the antistatic properties.

Illustrative of the quaternary ammonium benzosulfimides utilizable in the present invention are the alkyls such as cetyl trimethyl ammonium benzosulfimides, lauryl trimethyl ammonium benzosulfimide, etc.; the alkylaryls such as alkyl dimethyl benzyl ammonium benzosulfimide, lauryl dimethyl benzyl ammonium benzosulfimide, etc.; the N-alkylpyridiniums such as N-cetyl pyridinium benzosulfimide, etc.; the picoliniums such as myristyl gamma picolinium; the groupings wherein the molecule contains an ether linkage such as para-tertiary octylphenoxy-ethoxyethyl dimethyl benzyl ammonium benzosulfimide; groupings having oxygen in the form of amide or ester linkages such as N-(lauryl colamino formyl methyl)-pyridinium benzosulfimide and N-(myristyl colamino formyl methyl)-pyridinium benzosulfimide; those containing a sulfonamide group such as 2-phenyl-3-p-sulfamido-phenyl-5-undecyl-tetrazolium benzosulfimide and 4-sulfanilamido-benzyl tetradecyl dimethyl ammonium benzosulfimide; those containing a substituted aromatic nucleus such as lauryloxyphenyl trimethyl ammonium benzosulfimide, cetyl-amino-phenyl trimethyl ammonium benzosulfimide, dodecylbenzyl trimethyl ammonium benzosulfimide, etc.; the aliphatic and arylaliphatic isoquinoliniums such as lauryl isoquinolinium benzosulfimide, etc.; the aliphatic and arylaliphatic morpholiniums such as N-dodecyl-N-methyl morpholinium benzosulfimide, etc.; and the aliphatic and arylaliphatic imidazolinium benzosulfimides.

The following examples are illustrative but non-limitative of the present invention:

Example 1

A 2% by weight solution of each of the following quaternary ammonium benzosulfimides in Epolene E (pelletized, emulsifiable, relatively low molecular weight polyethylene wax produced by Eastman Chemical Products, Inc., Kingsport, Tenn.) were made:

(1) Alkyl dimethyl benzyl ammonium benzosulfimide
(2) Cetyl trimethyl ammonium benzosulfimide
(3) Dodecyl benzyl trimethyl ammonium benzosulfimide
(4) Alkenyl dimethyl ethyl ammonium benzosulfimide
(5) Lauryl isoquinolinium benzosulfimide Each of the aforementioned 2% solutions were made by melting together 5 gm. Epolene E and 100 mg. of the selected quaternary. In each case, when the entire mixture was molten, the ingredients thereof were intimately mixed and spread out in a layer or sheet. When cool, each sheet was utilized as a separate sample. A blank was also prepared in the same manner as the other samples except that the blank consisted only of 5 gm. Epolene E and had no quaternary component.

Each of the samples, including both the samples containing the quaternaries and the blank, were then treated by being rubbed briskly against a piece of cotton fabric and then being held about 4 mm. above a pile of cigar ashes. None of the five samples containing the quaternaries showed any evidence of static electricity since there was no adherence of the ashes. The blank, however, showed considerable static electricity since there was a large accumulation of adhered ashes thereon.

*Example 2*

Six sheets or samples of pure Epolene E were prepared, each sample weighing between about 2 and 3 gm. each. Five of these samples were each surface coated with a different quaternary ammonium benzosulfimide selected from the following:

(1) Dodecyl benzyl trimethyl ammonium benzosulfimide
(2) Cetyl trimethyl ammonium benzosulfimide
(3) Alkyl dimethyl benzyl ammonium benzosulfimide
(4) Lauryl isoquinolinium benzosulfimide
(5) Alkenyl dimethyl ethyl benzosulfimide After being surface-coated, each of the above five samples was washed rapidly with methanol to remove any excess quaternary. The surface coating on each sample weighed between 2 and 4 mg.

The five coated samples plus the sixth uncoated sample or blank were then each rubbed briskly against a piece of cotton fabric and held about 4 mm. above a pile of cigar ashes. There was no adhesion of ashes to any of the five coated samples. However, the uncoated blank had a large amount of ashes adhered thereto.

In addition to their antistatic properties, various of the quaternaries utilized in these examples, such as the dodecyl benzyl trimethyl ammonium benzosulfimide, the alkyl dimethyl benzyl ammonium benzosulfimide and the lauryl isoquinolinium benzosulfimide are completely water-insoluble, while the others are generally less water-soluble than the ordinary quaternary ammonium salts. These compounds are, therefore, either not at all or much less subject to leaching out when exposed to water than are the ordinary quaternary ammonium salts.

Obviously many modifications and variations of the present invention are possible in the light of the above teachings. It is, therefore, to be understood that within the scope of the appended claims, the invention may be practiced otherwise than as specifically described.

The invention claimed is:

1. A method of providing antistatic properties in electrically non-conductive substances which comprises physically combining a quaternary ammonium benzosulfimide with a non-conductive substance selected from the group consisting of paper, glass, textiles, leathers, furs, waxes and plastics in such a manner that at least about 1% by weight of the quaternary ammonium benzosulfimide is present in that portion of the substance with which it is directly combined, while maintaining the physical dominance of the non-conductive substance in the combination.

2. The method of claim 1 wherein the quaternary ammonium benzosulfimide is intermixed with said non-conductive substance.

3. The method of claim 1 wherein the non-conductive substance is impregnated with the quaternary ammonium benzosulfimide.

4. The method of claim 1 wherein the non-conductive substance is surface-coated with the quaternary ammonium benzosulfimide.

References Cited in the file of this patent

UNITED STATES PATENTS

| 2,828,316 | Pacini et al. | Mar. 25, 1958 |
| 2,878,144 | Conbere et al. | Mar. 17, 1959 |
| 3,005,720 | Teller | Oct. 24, 1961 |

OTHER REFERENCES

Condensed Chemical Dictionary, page 995, 6th edition, Reinhold Publishing Company.